US011155038B2

United States Patent
Kihara et al.

(10) Patent No.: US 11,155,038 B2
(45) Date of Patent: Oct. 26, 2021

(54) INFORMATION PROCESSING APPARATUS, MODELING APPARATUS, AND INFORMATION PROCESSING METHOD

(71) Applicant: SONY CORPORATION, Tokyo (JP)

(72) Inventors: Nobuhiro Kihara, Aichi (JP); Akira Kondo, Aichi (JP); Motohiko Watanabe, Kanagawa (JP); Yedan Sun, Tokyo (JP)

(73) Assignee: SONY CORPORATION, Tokyo (JP)

( * ) Notice: Subject to any disclaimer, the term of this patent is extended or adjusted under 35 U.S.C. 154(b) by 219 days.

(21) Appl. No.: 16/344,012

(22) PCT Filed: Nov. 13, 2017

(86) PCT No.: PCT/JP2017/040707
§ 371 (c)(1),
(2) Date: Apr. 22, 2019

(87) PCT Pub. No.: WO2018/096963
PCT Pub. Date: May 31, 2018

(65) Prior Publication Data
US 2019/0337225 A1 Nov. 7, 2019

(30) Foreign Application Priority Data
Nov. 24, 2016 (JP) .............................. JP2016-228184

(51) Int. Cl.
*B29C 64/393* (2017.01)
*B29C 64/236* (2017.01)
(Continued)

(52) U.S. Cl.
CPC .......... *B29C 64/393* (2017.08); *B29C 64/135* (2017.08); *B29C 64/147* (2017.08);
(Continued)

(58) Field of Classification Search
CPC ... B29C 64/218; B29C 64/236; B29C 64/241; B29C 64/386; B29C 64/393
See application file for complete search history.

(56) References Cited

U.S. PATENT DOCUMENTS

| 5,425,848 A * | 6/1995 | Haisma ................. B29C 39/148 |
| | | 216/48 |
| 8,177,332 B2 * | 5/2012 | Thompson ............. B41J 11/002 |
| | | 347/51 |

(Continued)

FOREIGN PATENT DOCUMENTS

| EP | 3085516 A1 | 10/2016 |
| JP | 04-138245 A | 5/1992 |

(Continued)

OTHER PUBLICATIONS

Office Action for JP Patent Application No. 2016-228184 dated Sep. 15, 2020, 3 pages of Office Action and 4 pages of English Translation.

(Continued)

*Primary Examiner* — Atul P. Khare
(74) *Attorney, Agent, or Firm* — Chip Law Group

(57) ABSTRACT

[Solving Means] An information processing apparatus to be used for a modeling apparatus including a stage, a regulation member, an irradiation unit, and a moving mechanism and includes an acquisition unit, an irradiation position control unit, and a compensation unit. The acquisition unit is configured to acquire the plurality of slice image data items. The irradiation position control unit is configured to variably control, in accordance with the number of laminated layers of a material, an irradiation position of the energy ray to the material in a direction of relative movement of the stage and the regulation member within a modeling surface of the stage. The compensation unit is configured to compensate for a reference position of at least one slice image data item (Continued)

of the plurality of slice image data items in accordance with a change of the irradiation position.

12 Claims, 9 Drawing Sheets

(51) Int. Cl.

| | | |
|---|---|---|
| B29C 64/218 | (2017.01) | |
| B29C 64/147 | (2017.01) | |
| B29C 64/135 | (2017.01) | |
| B29C 64/268 | (2017.01) | |
| B29C 64/386 | (2017.01) | |
| B29C 64/241 | (2017.01) | |
| B33Y 10/00 | (2015.01) | |
| B33Y 30/00 | (2015.01) | |
| B33Y 50/02 | (2015.01) | |

(52) U.S. Cl.
CPC ......... *B29C 64/218* (2017.08); *B29C 64/236* (2017.08); *B29C 64/241* (2017.08); *B29C 64/268* (2017.08); *B29C 64/386* (2017.08); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 8,540,501 B2* | 9/2013 | Yasukochi | ............ | B29C 64/135 425/89 |
| 8,696,971 B2* | 4/2014 | Boot | .................... | B29C 64/135 264/401 |
| 9,676,144 B2* | 6/2017 | Okamoto | .............. | B29C 64/112 |
| 10,324,454 B2* | 6/2019 | Maeda | .................. | B29C 64/106 |
| 10,343,390 B2* | 7/2019 | Knecht | ................. | B29C 64/106 |
| 10,618,270 B2* | 4/2020 | Knecht | ................. | B29C 64/236 |
| 10,717,263 B2* | 7/2020 | Knecht | ................. | B29C 64/236 |
| 2012/0045617 A1 | 2/2012 | Yasukochi | | |
| 2016/0311163 A1 | 10/2016 | Yasukochi | | |
| 2017/0239885 A1* | 8/2017 | Knecht | ................. | B29C 64/232 |
| 2017/0348902 A1* | 12/2017 | Ohara | .................... | B33Y 50/02 |

FOREIGN PATENT DOCUMENTS

| | | | | |
|---|---|---|---|---|
| JP | 10-202756 A | 8/1998 | | |
| JP | 10-329219 A | 12/1998 | | |
| JP | 2001-301045 A | 10/2001 | | |
| JP | 2012-040757 A | 3/2012 | | |
| JP | 2015-120261 A | 7/2015 | | |
| JP | 2015-221572 A | 12/2015 | | |
| JP | 2017-061067 A | 3/2017 | | |
| WO | WO-2014006399 A1 * | 1/2014 | ........... | B29C 64/245 |
| WO | WO-2015093032 A1 * | 6/2015 | ........... | B29C 64/135 |

OTHER PUBLICATIONS

International Search Report and Written Opinion of PCT Application No. PCT/JP2017/040707, dated Dec. 19, 2017, 9 pages of ISRWO.

* cited by examiner

INFORMATION PROCESSING APPARATUS, MODELING APPARATUS, AND INFORMATION PROCESSING METHOD

CROSS REFERENCE TO RELATED APPLICATIONS

This application is a U.S. National Phase of International Patent Application No. PCT/JP2017/040707 filed on Nov. 13, 2017, which claims priority benefit of Japanese Patent Application No. JP 2016-228184 filed in the Japan Patent Office on Nov. 24, 2016. Each of the above-referenced applications is hereby incorporated herein by reference in its entirety.

TECHNICAL FIELD

The present technology relates to a modeling apparatus that forms a three-dimensional object from a material to be curable by an energy ray of light or the like, to an information processing apparatus and an information processing method to be used for the same, and to a program therefor.

BACKGROUND ART

One of methods mainly used for a modeling apparatus is an optical modeling method, for example. The optical modeling method is a method in which, by partially selectively irradiating a light-curable resin with laser light, a desired portion of the resin is cured and drawn for forming a modeled object. The optical modeling method includes a method called regulated liquid level method. In the regulated liquid level method, the liquid level of the light-curable resin is regulated by, for example, a flat glass surface and drawing is performed by laser light being focused on an interface between the liquid level and the glass surface via the glass.

A modeling apparatus described in Patent Literature 1 or 2 includes, for example, a cylindrical drum. A slit region long in one direction is formed between a drum and a modeling stage. In this slit region, a light-curable material is irradiated with light. It is called one-dimensional regulated liquid level method.

CITATION LIST

Patent Literature

Patent Literature 1: Japanese Patent Application Laid-open No. 2012-40757
Patent Literature 2: Japanese Patent Application Laid-open No. 2015-120261

DISCLOSURE OF INVENTION

Technical Problem

A demand for improving the modeling accuracy of the modeling apparatus, that is, forming the modeled object with high accuracy is increasing year by year.

It is an object of the present disclosure to provide a modeling apparatus capable of forming a highly accurate modeled object and a manufacturing method for that modeled object.

Solution to Problem

In order to accomplish the above-mentioned object, an information processing apparatus according to an embodiment is an information processing apparatus to be used for a modeling apparatus including a stage, a regulation member, an irradiation unit, and a moving mechanism and includes an acquisition unit, an irradiation position control unit, and a compensation unit.

The stage includes a modeling surface on which a modeled object is formed.

The regulation member includes a surface including an adjacent region, the regulation member being capable of being arranged with respect to the stage to form a holding region for holding a material between the adjacent region and the stage.

The irradiation unit selectively radiates, on the basis of a plurality of slice image data items that constitute three-dimensional data of an object to be modeled, an energy ray to a region of the material held in the holding region via the adjacent region of the regulation member.

The moving mechanism moves the stage and the regulation member relative to each other.

The acquisition unit is configured to acquire the plurality of slice image data items.

The irradiation position control unit is configured to variably control, in accordance with the number of laminated layers of the material, an irradiation position of the energy ray to the material in a direction of relative movement of the stage and the regulation member within the modeling surface.

The compensation unit is configured to compensate for a reference position of at least one slice image data item of the plurality of slice image data items in accordance with a change of the irradiation position.

In this modeling apparatus, the irradiation position in the direction of relative movement of the stage and the regulation member within the modeling surface is controlled in accordance with the number of layers of the material. Therefore, an optimal irradiation position can be realized for each number of layers. With this, the modeling accuracy can be improved. In that case, by the compensation unit compensating for the reference position of the slice image data item, occurrence of a deviation of a physical modeling position due to the change of the irradiation position can be prevented.

The irradiation unit, the compensation unit may be configured to shift, if a first region of the holding region includes a reference irradiation position, the reference position in accordance with a shift amount of the irradiation position from the reference irradiation position, the first region being located between a region of the adjacent region, which is closest to the stage, and the stage. With this, occurrence of a deviation of a physical modeling position due to the change of the irradiation position can be prevented.

The irradiation position control unit may radiate, when the number of layers of the material is in a first range, the energy ray to the material located in a first region of the holding region, the first region being located between a region of the adjacent region, which is closest to the stage, and the stage. Further, the irradiation position control unit may radiate, when the number of layers of the material is in a second range larger than the first range, the energy ray to the material located in a second region of the holding region, the second region being different from the first region.

In the second range in which the number of layers is relatively large, the energy ray is radiated to the material located in the second region different from the first region. With this, a relatively large amount of material is cured and that cured material is pressed in the first region of the holding region and the latest cured layer can be made to securely adhere to the cured material up to the previous layer. As a result, a highly accurate modeled object is formed.

The irradiation position control unit may shift, when the number of laminated layers of the material is in a third range, the irradiation position stepwisely from the first region to the second region for each layer or for every multiple layers, the third range being larger than the first range and smaller than the second range.

The irradiation position control unit may set the irradiation position on a side opposite to a side of a direction of travel of the stage with respect to the regulation member, using the reference irradiation position as a center.

After the material is irradiated with the energy ray and is cured, that cured material is pressed between the stage or the cured material up to the previous layer, which adheres to the stage, and the regulation member when passing through the first region of the holding region, and the latest cured material can be made to adhere to the stage or the cured material up to the previous layer. As a result, the modeling accuracy can be improved.

The moving mechanism may reciprocate the stage or the regulation member in a direction of relative movement within the modeling surface, and the irradiation position control unit may respectively set the irradiation position for each of forward movement and backward movement of the stage or the regulation member and radiate the energy ray. With this, the modeling speed increases and the productivity can be improved.

The information processing apparatus may further include a presentation unit that presents information for a user to select modeling processing based on one profile of a plurality of profiles expressing a change of the irradiation position for each number of layers.

An information processing apparatus according to another embodiment includes, instead of the irradiation position control unit, an irradiation position control unit configured to variably control, in accordance with a distance between the modeling surface and the adjacent region, an irradiation position of the energy ray to the material in a direction of relative movement of the stage and the regulation member within the modeling surface.

A modeling apparatus according to an embodiment is a modeling apparatus including the above-mentioned information processing apparatus.

An information processing method according to an embodiment is a method to be executed by the above-mentioned information processing apparatus.

A program according to an embodiment is a program for a modeling apparatus (or an information processing apparatus) to execute the above-mentioned information processing method.

Advantageous Effects of Invention

As described above, in accordance with the present technology, it is possible to form a modeled object having a highly accurate shape.

It should be noted that the effects described here are not necessarily limitative and any effect described in the present disclosure may be provided.

MODE(S) FOR CARRYING OUT THE INVENTION

Hereinafter, embodiments according to the present technology will be described with reference to the drawings.

1. EMBODIMENT 1

1.1) Configuration of Modeling Apparatus

Figure 1:
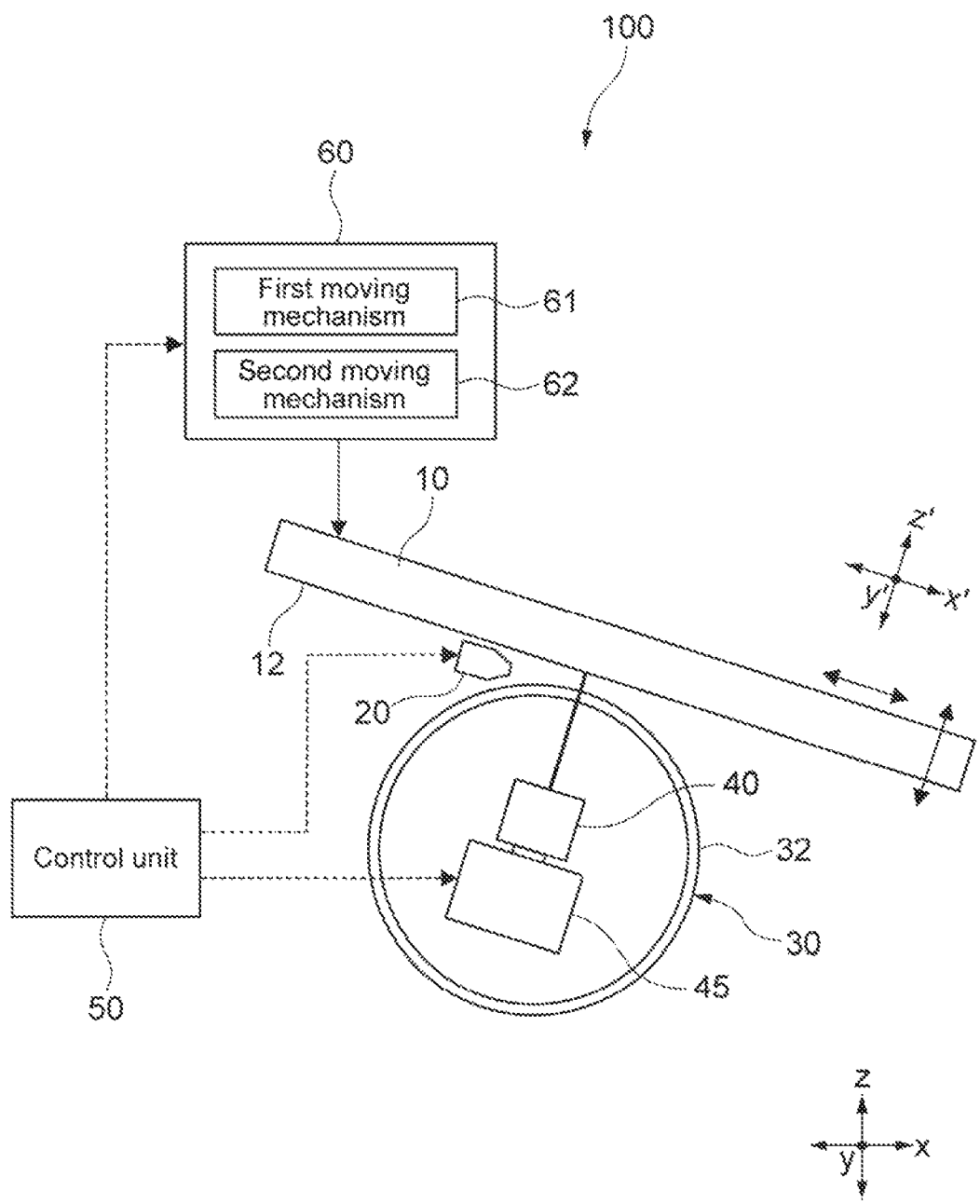
FIG. 1 is a schematic side view showing a modeling apparatus according to an embodiment of the present technology.
Figure 2:
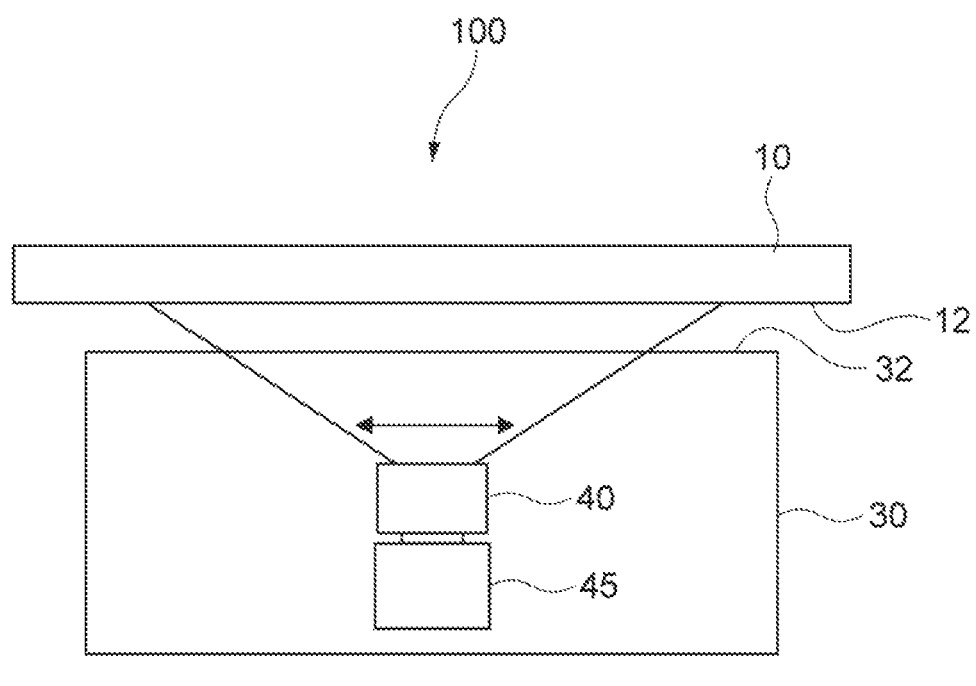
FIG. 2 is a front view of the modeling apparatus shown in FIG. 1.

FIG. 1 is a schematic side view showing a modeling apparatus according to an embodiment of the present technology. FIG. 2 is a front view of a modeling apparatus 100 shown in FIG. 1. The modeling apparatus 100 mainly includes a stage 10, a drum 30 as a regulation member, a material supplying mechanism including a nozzle 20, an irradiation unit 40, a stage moving mechanism 60, an irradiation unit moving mechanism 45, and a control unit 50.

For the sake of description, in a three-dimensional space in which the modeling apparatus 100 is arranged, a vertical axis in a height direction will be referred to as a z axis and two axes along a horizontal plane perpendicular to the z axis will be referred to as x and y axes.

The stage 10 includes a modeling surface 12 which is a surface on a side on which a modeled object is formed. The stage 10 is arranged above the drum 30 with the modeling surface 12 facing a side of the drum 30. The stage 10 is arranged in such a manner that the modeling surface 12 is tilted at a particular tilt angle in a direction of rotation about the y axis with respect to an x-y plane which is the horizontal plane. That tilt angle with respect to the x-y plane is arbitrarily set.

For the sake of description, a coordinate system when a (x, y, z) coordinate system is rotated by an amount corresponding to the tilt angle of the stage 10 around the y axis is defined as a (x', y', z') coordinate system.

The drum 30 is arranged in such a manner that a longitudinal axis of that cylinder is along the y axis. The drum 30 includes a material that allows an energy ray emitted from the irradiation unit 40 to pass therethrough. In a case where a light-curable resin is used as a constituent material of the modeled object, light is used as the energy ray. Hereinafter, the constituent material of the modeled object will be referred to as a resin material. Typically, the resin material is an ultraviolet ray-curable resin and the energy ray is an ultraviolet ray. A transparent material that allows that ultraviolet ray to pass therethrough, for example, a glass, an acrylic resin, or the like is used as the material of the drum 30.

The material supplying mechanism is configured to be capable of supplying the resin material between the drum 30 and the stage 10. Specifically, the nozzle 20 in the material supplying mechanism is arranged between the drum 30 and the stage 10 and is configured to supply a resin material R (see FIG. 3) between the cylindrical surface of the drum 30 and the modeling surface 12 of the stage 10. The nozzle 20 includes a plurality of nozzles provided in a y direction or includes an ejection slit long in the y direction.

Although not shown in the figure, the material supplying mechanism includes a tank that stores the resin material, piping connected to the nozzle 20, a valve provided in the piping, a pump that feeds the resin material under pressure, and the like.

Figure 3:
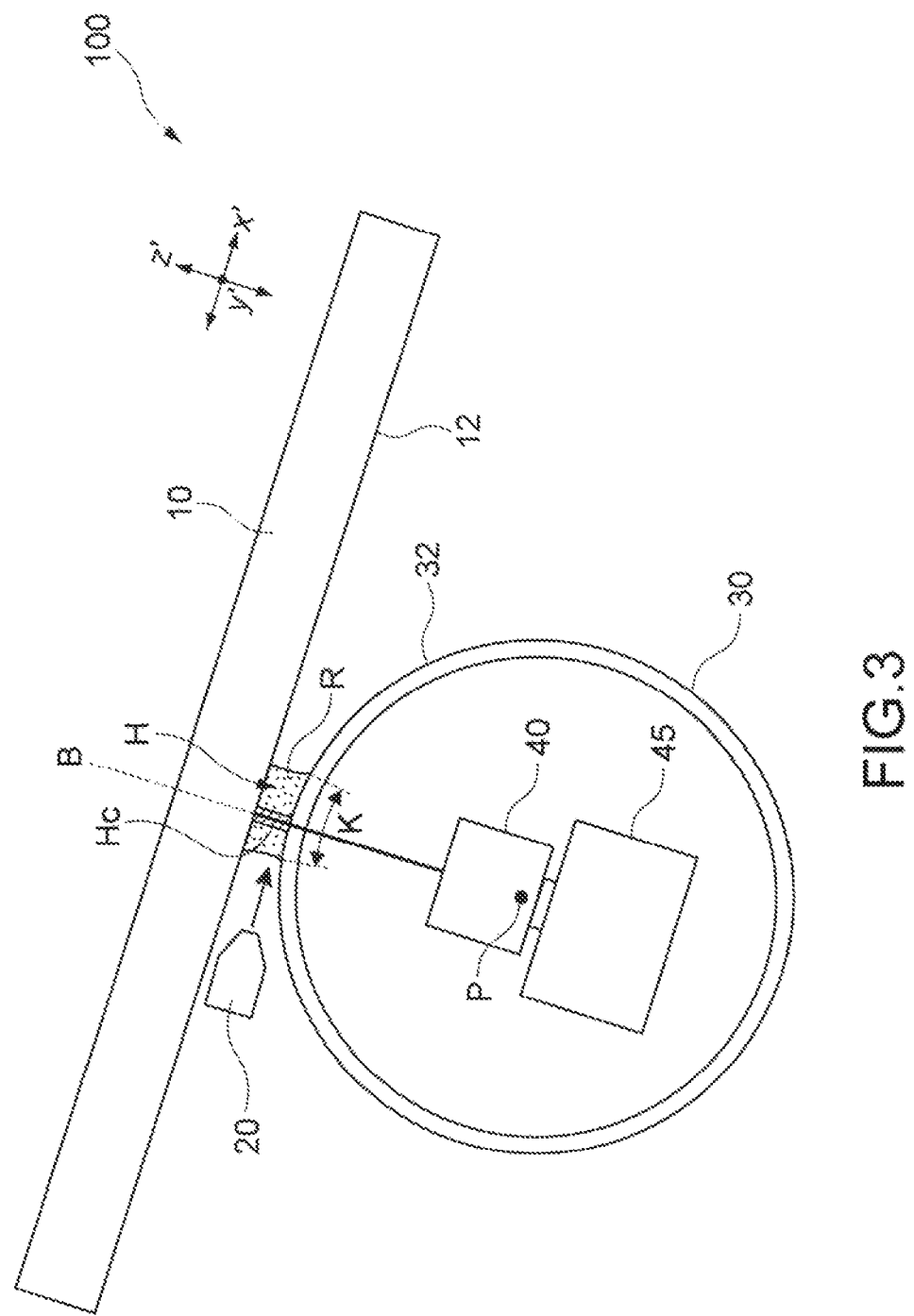
FIG. 3 is a diagram showing a stage and a drum in an enlarged state.

FIG. 3 is a diagram showing the stage 10 and the drum 30 in an enlarged state. A surface 32 of the drum 30 includes an adjacent region K adjacent to the stage 10. The drum 30 is arranged with respect to the stage 10 in such a manner that a holding region H for holding the resin material R is formed between that adjacent region K and the modeling surface 12 of the stage 10. The resin material R is mainly held by surface tension.

The drum 30 is arranged below the modeling surface 12 of the stage 10 and the stage 10 is tilted. It makes it easy for an uncured resin material R to flow and be removed obliquely downward in the x' direction of the modeling surface 12.

The holding region H includes a narrowest portion (first region) Hc at a position of a region (most adjacent region) of the adjacent region K, which is closest to the stage 10. The holding region H is a spatial region between the drum 30 and the stage 10 in a range of approximately several mm to several cm in a circumferential direction of the surface 32 of the drum 30 from the narrowest portion Hc. It should be noted that the range of the holding region H in the circumferential direction of the drum 30 is a value variable in a manner that depends on the resin material R, the material of the drum 30, and/or the size of the drum 30, and is not limited to such a range of several mm to several cm.

A distance between the modeling surface 12 and the surface 32 of the drum 30 at the narrowest portion Hc is substantially equal to a thickness of a single cured layer of the resin material R. That distance is 50 μm to 500 μm, for example, and can be arbitrarily set in a manner that depends on the size, definition, and the like of a final modeled object.

As shown in FIG. 3, the modeling apparatus 100 further includes a motor (not shown) that rotates the drum 30 about a central axis P of the cylinder. The central axis P extends in the y direction. For example, by rotating the drum 30 by a predetermined angle every time light exposure is performed for each layer or for every multiple layers, the motor rotates the drum 30 when changing the adjacent region K with respect to the stage 10 or at the time of maintenance.

The irradiation unit 40 is arranged inside the cylinder of the drum 30. The irradiation unit 40 selectively radiates light to the region of the resin material R held in the holding region H via the drum 30 on the basis of a plurality of slice image data items that constitute three-dimensional data of an object to be modeled. The irradiation unit 40 includes a laser light source, a polygon mirror, and a lens system (not shown). Those components are configured, housed in a single casing, for example. The polygon mirror may be replaced by a galvanometer mirror.

As shown in FIG. 1, the stage moving mechanism 60 includes a first moving mechanism 61 and a second moving mechanism 62. The first moving mechanism 61 is configured to move the stage 10 in the x' direction along the modeling surface 12 of the stage 10 arranged at a predetermined tilt angle. The second moving mechanism 62 is configured to move the stage 10 in a lamination direction of the resin material R, i.e., in a direction (z' direction) in which the stage 10 is brought into contact with or is spaced away from the drum 30.

Those first moving mechanism 61 and second moving mechanism 62 include various well-known drive mechanisms such as ball screw driving, rack and pinion driving, and belt driving.

The control unit 50 is configured to control the respective operations of the stage moving mechanism 60, the irradiation unit moving mechanism 45, the material supplying mechanism, and the motor of the drum 30. The control unit 50 functions as an information processing apparatus. The control unit 50 typically includes a computer installing a central processing unit (CPU), a random access memory (RAM), a read only memory (ROM), and the like. The control unit 50 may include a programmable logic device (PLD) such as a field programmable gate array (FPGA).

The control unit 50 may be incorporated integrally with the modeling apparatus 100 or may be provided as a computer (e.g., PC) separate from the modeling apparatus 100. Alternatively, some functions of the control unit 50 may be incorporated in the modeling apparatus 100 and other functions may be incorporated in the separate computer.

The irradiation unit moving mechanism 45 is connected to the irradiation unit 40 and is configured to shift the irradiation unit 40 in at least the x' direction. The above-mentioned well-known drive mechanisms are used as a driving method therefor.

Figure 4:
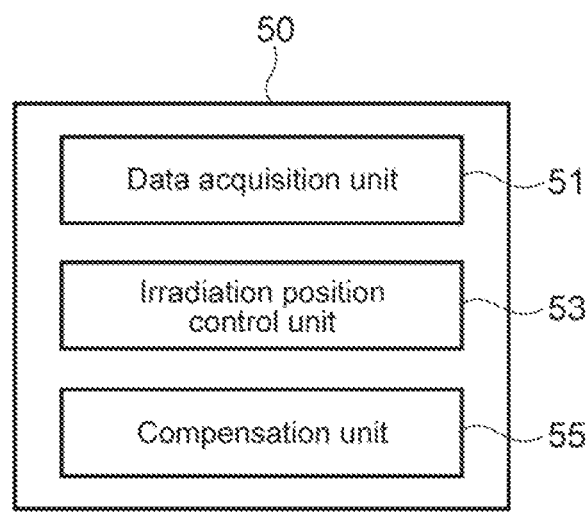
FIG. 4 is a block diagram showing a main configuration of a control unit.

FIG. 4 is a block diagram showing a main configuration of the control unit 50. The control unit 50 includes a data acquisition unit (acquisition unit) 51, an irradiation position control unit 53, and a compensation unit 55.

The data acquisition unit 51 has a function of acquiring the plurality of slice image data items described above. A format of standard triangulated language or stereolithography (STL), for example, is used as the three-dimensional data. The data acquisition unit 51 generates slice images which are lamination data of the three-dimensional data and obtains final slice image data items through processing such as gray-scale processing and distraction correction. The data acquisition unit 51 may have a function of executing those respective processes and may acquire a plurality of final slice image data items generated by another computer.

The irradiation position control unit 53 has a function of controlling driving of the irradiation unit moving mechanism 45 in accordance with the number of laminated layers of the resin material. With this, the irradiation position control unit 53 variably controls a light irradiation position to the resin material in a direction of relative movement of the stage 10 and the drum 30 within the modeling surface 12, that is, the x' direction.

The compensation unit 55 has a function of compensating for a reference position of at least one slice image data item of the plurality of slice image data items in accordance with a change of the irradiation position.

1.2) Relationship between Reference Irradiation Position and Reference Position of Slice Image Data Item In a case where the irradiation unit 40 is arranged at such a position that light is radiated to the resin material located at the narrowest portion Hc, that irradiation position on the x' axis is set as a reference irradiation position B. Further, in the processing of the control unit 50 at this time, a position of a coordinate (virtually corresponding to the x' axis) at which the slice image data item is arranged is set as a reference position. That is, in light exposure processing at the reference irradiation position B, the irradiation unit 40 radiates light while making the reference position of the slice image data item correspond to the reference irradiation position.

As the reference position on the coordinate of the slice image data item, an arbitrary point in a rectangular image, for example, at least one of four vertices, a center point, and the like can be exemplified.

1.3) Operation of Modeling Apparatus

A laser beam emitted from the laser light source is scanned along one line in the y' direction as shown in FIG. 2 by driving the polygon mirror. During a scan for one line, the laser light source repeats ON/OFF of radiation on the basis of (data for one line in the y' direction of) cross-section data of the modeled object. With this, the region of the resin material R along that one line in the y' direction is selectively subjected to light exposure.

By repeating such selective light exposure for one line while the first moving mechanism 61 is moving the stage 10 in the x' direction, the modeled object for one layer is formed. Basically, during one-way movement of the stage 10 by the first moving mechanism 61, i.e., in a process in which the stage 10 is lifted in an upper left direction in the x' direction in FIG. 3, light exposure is performed (light exposure during forward movement).

When the light exposure processing for one layer ends, the control unit 50 stops light irradiation by the irradiation unit 40 and the stage 10 moves in a lower right direction in the x' direction in FIG. 3 and returns to the original position. Basically, the irradiation unit 40 does not perform light exposure on the resin material R during return movement (during backward movement) of the stage 10 in the lower right direction.

The modeling apparatus 100 forms a three-dimensional modeled object by performing the above-mentioned operation for each layer of the resin material R while the second moving mechanism 62 is moving the stage 10 in the z' direction.

1.4) Shift Operation of Irradiation Unit (Irradiation Position)

1.4.1) EXAMPLE 1

Figure 5:
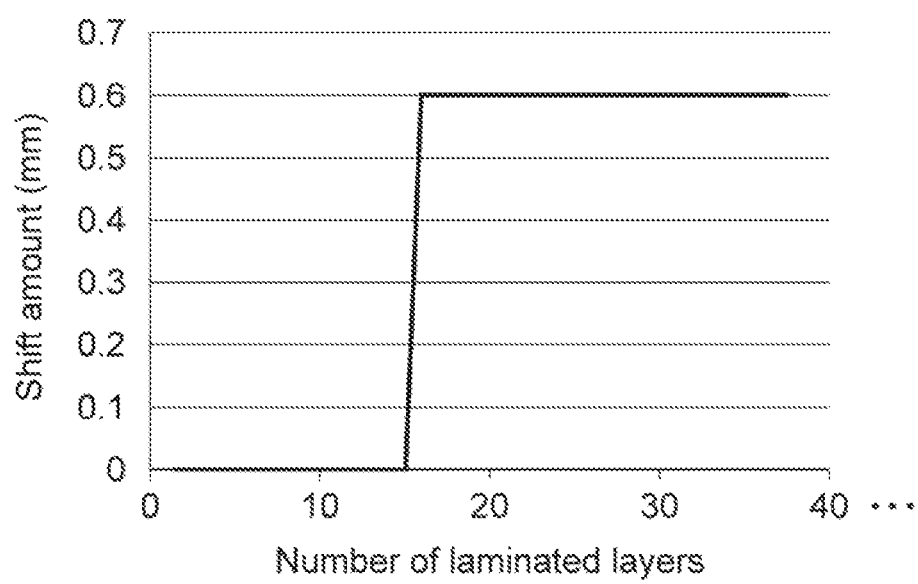
FIG. 5 is an example (Example 1) of a graph showing a relationship between the number of layers of a resin material (cured material) and a shift amount of an irradiation unit in an x' direction.

FIG. 5 is an example (Example 1) of a graph showing a relationship between the number of laminated layers (number of layers) of the resin material (cured material) and a shift amount of the irradiation unit 40 in the x' direction by the irradiation unit moving mechanism 45 in the operation of the modeling apparatus 100. For example, if the power of the modeling apparatus 100 is turned ON, the control unit 50 reads the data of this graph and controls driving of the irradiation unit moving mechanism 45 in accordance with a profile of this graph.

In light exposure processing when the number of layers is 1 or more and 15 or less (in a first range), for example, the irradiation unit 40 is arranged at such a position that light exposure is performed at the reference irradiation position.

Figure 6:
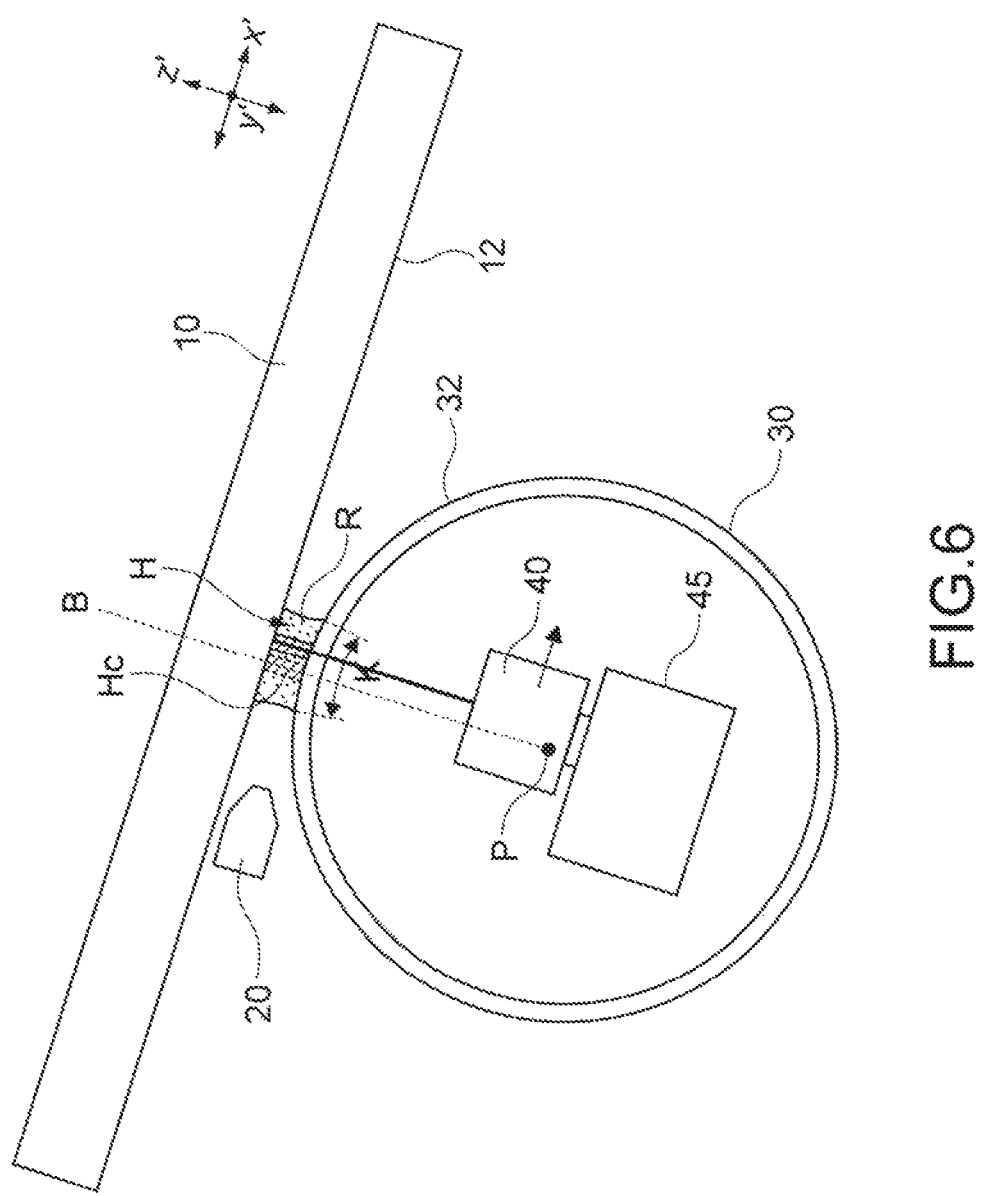
FIG. 6 shows the irradiation unit and a state in which an irradiation position is shifted from a reference irradiation position.

In light exposure processing when the number of layers is 16 or more (in a second range), the irradiation unit moving mechanism 45 shifts the irradiation unit 40 in the lower right direction along the x' axis by a predetermined distance from the reference irradiation position. With this, as shown in FIG. 6, the irradiation position shifts from the narrowest portion Hc located at the reference irradiation position B by that shift amount. As a result, when the number of layers is 16 or more, the irradiation unit 40 radiates light to the resin material located in a region of the holding region H, which is spaced away from the narrowest portion Hc by that shift amount (second region different from the first region). A maximum range of the shift amount of the irradiation position falls in the range of the holding region H.

Although the shift amount is, for example, 600 μm in the example of the graph shown in FIG. 5, the shift amount can be changed as appropriate in a manner that depends on the kinds of the resin material and the energy ray and the like.

Here, as described above, a shift direction of the irradiation position is a direction (lower right direction) opposite to a direction of travel (upper left direction) of the stage 10, using the narrowest portion Hc located at the reference irradiation position B as a center. That is, when the cured material formed by light irradiation in the region spaced away from the narrowest portion Hc moves in the direction of travel of the stage 10 and passes through the narrowest portion Hc, it is pressed between the stage 10 or the cured material up to the previous layer, which adheres to the stage 10, and the drum 30. Therefore, the latest cured material can be made to adhere to the stage 10 or the cured material up to the previous layer. With this, an effect that the cured resin material can be prevented from adhering to the surface 32 of the drum 30, for example, is provided. It contributes to highly accurate modeling processing.

As shown in FIG. 6, the compensation unit 55 shifts the reference position on the coordinate of the slice image data item in accordance with the shift amount of the irradiation position from the reference irradiation position B. That is, occurrence of a deviation of a physical modeling position on the x' axis can be prevented by shifting the reference position on the coordinate of the slice image data item in a direction opposite to the direction in which the irradiation position has shifted from the reference irradiation position B.

As described above, in this modeling apparatus 100, the irradiation position in the direction of relative movement by the first moving mechanism 61 is controlled in accordance with the number of layers of the resin material. Therefore, an optimal irradiation position for improving the modeling accuracy for each number of layers can be realized.

The upper limit value of the number of layers in the first range described above is not limited to 15, and can be set to any one value of 3 to 20, for example. The lower limit value of the number of layers in the second range described above is not limited to 16, and can be set to any one value of 4 to 21, for example.

1.4.2) EXAMPLE 2

Figure 7:
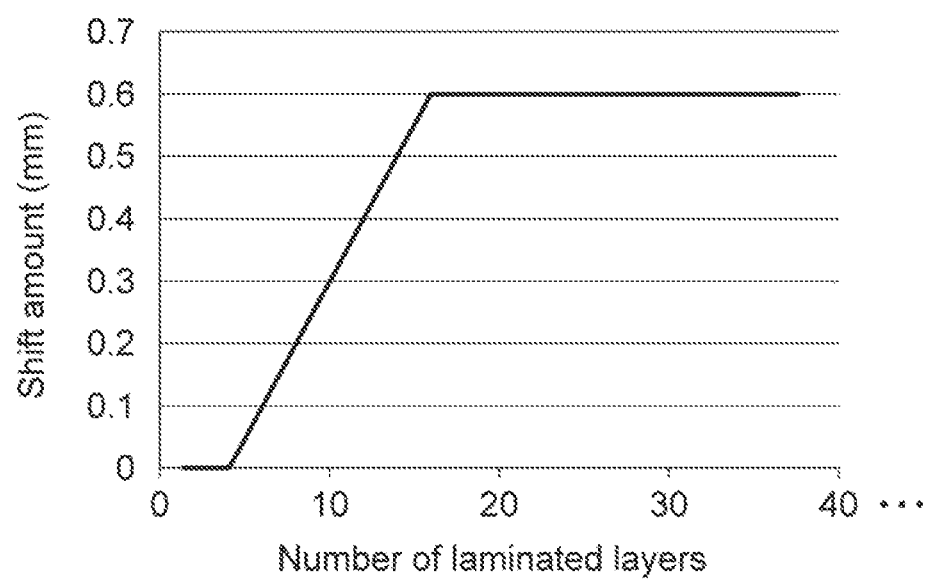
FIG. 7 shows an example (Example 2) of a graph showing a relationship between the number of layers of the resin material (cured material) and the shift amount of the irradiation unit in the x' direction according to another example.

FIG. 7 shows an example (Example 2) of a graph showing a relationship between the number of layers of the resin material (cured material) and the shift amount of the irradiation unit 40 in the x' direction according to another example. In this example, when the number of layers is in a range (third range) from first 5 layers to 16 layers (e.g., 3 layers), the irradiation position gradually (stepwisely) shifts for each layer or for every multiple layers.

In this example, regarding 16 layers or more, the shift amount is constant. The upper limit value of the number of layers in the first range and the lower limit value of the number of layers in the second range can also be changed as appropriate as described above.

Also with the profile of the shift amount as shown in this Example 2, the modeling accuracy by this modeling apparatus 100 can be improved.

Also in this Example 2, the compensation unit 55 shifts the reference position on the coordinate of the slice image data item in accordance with the shift amount of the irradiation position from the reference irradiation position B as in Example 1 described above. With this, occurrence of a deviation of a physical modeling position on the x' axis is prevented.

The profile is not limited to the profiles shown in Examples 1 and 2 described above. As another profile, there can be an example in which the shift amount in the third range shown in FIG. 7 stepwise increases.

2. EMBODIMENT 2

Figure 8A:
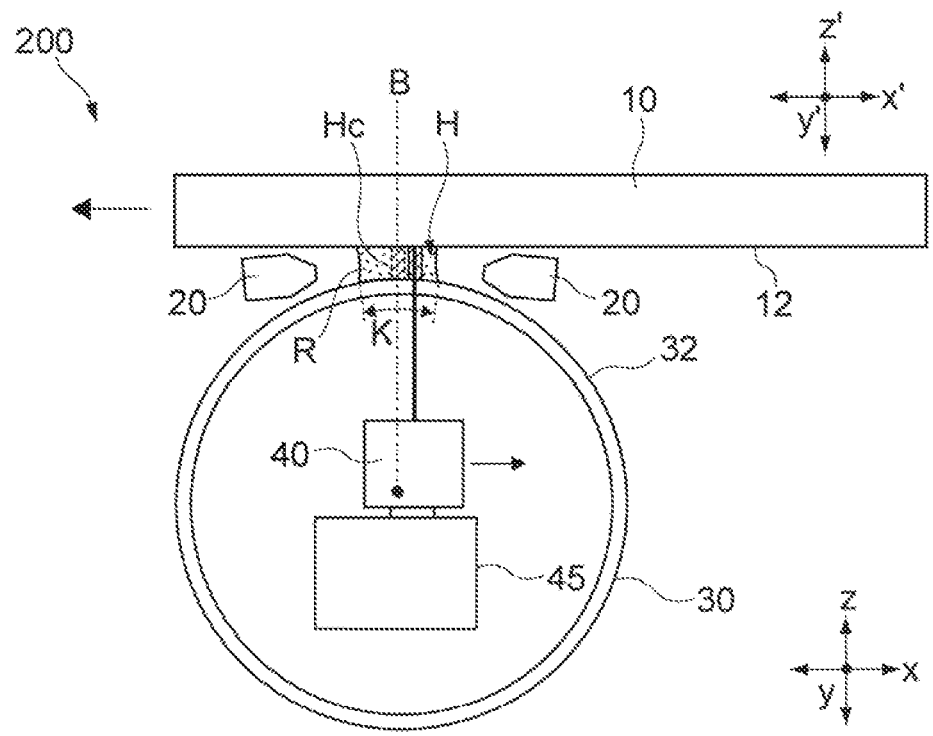
FIG. 8A is a side view showing a modeling apparatus according to Embodiment 2.

FIG. 8A is a side view showing a modeling apparatus according to Embodiment 2. Hereinafter, elements substantially similar to the members, functions, and the like of the modeling apparatus 100 according to Embodiment 1 described above will be denoted by the same reference signs and descriptions thereof will be simplified or omitted and different points will be mainly described.

In this modeling apparatus 200, the stage 10 is arranged such that the modeling surface 12 extends substantially along the horizontal plane. With this, the resin material R uniformly flows in the x' direction (in the figure, the left and right directions), and thus the modeling accuracy in the x' direction is stable.

In this embodiment, light exposure is executed on both paths of a forward path and a backward path for movement of the stage 10 by the first moving mechanism 61 (see FIG. 1).

Two nozzles 20 are arranged in an x direction. These nozzles 20 are arranged linearly symmetrical with the z axis, for example. In this embodiment, either one of the two nozzles 20 is selected such that the resin material R is efficiently supplied into the holding region H in such reciprocating light exposure, and the resin material is ejected at a suitable timing. It should be noted that the nozzle 20 may be single as in Embodiment 1 as long as the resin material can be supplied from the nozzle 20 into the holding region H.

Figure 8B:
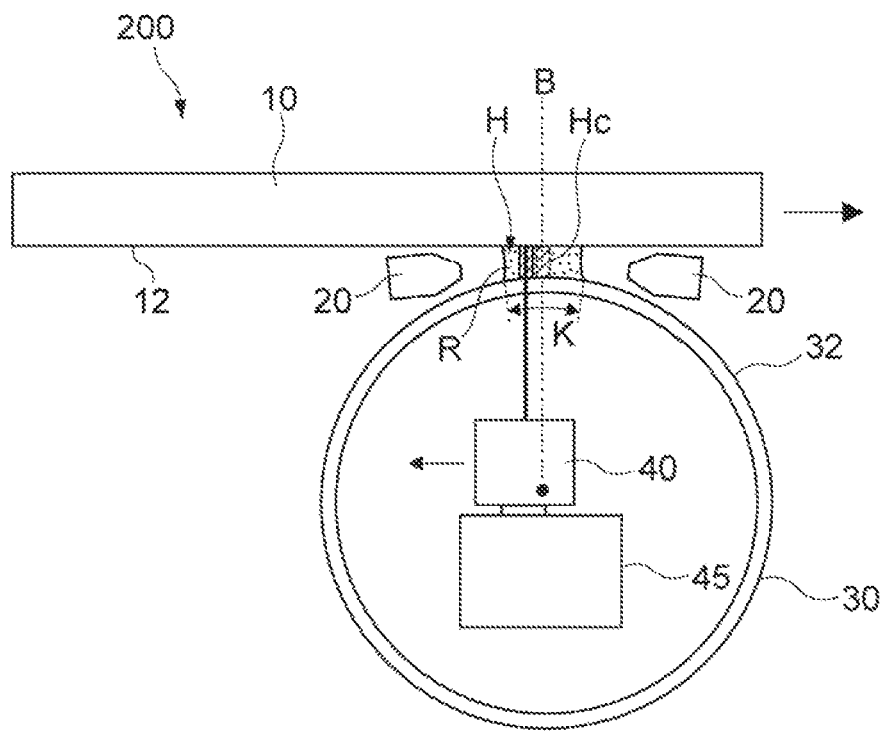
FIG. 8B shows the irradiation unit and the state in which the irradiation position is shifted from the reference irradiation position.
Figure 9:
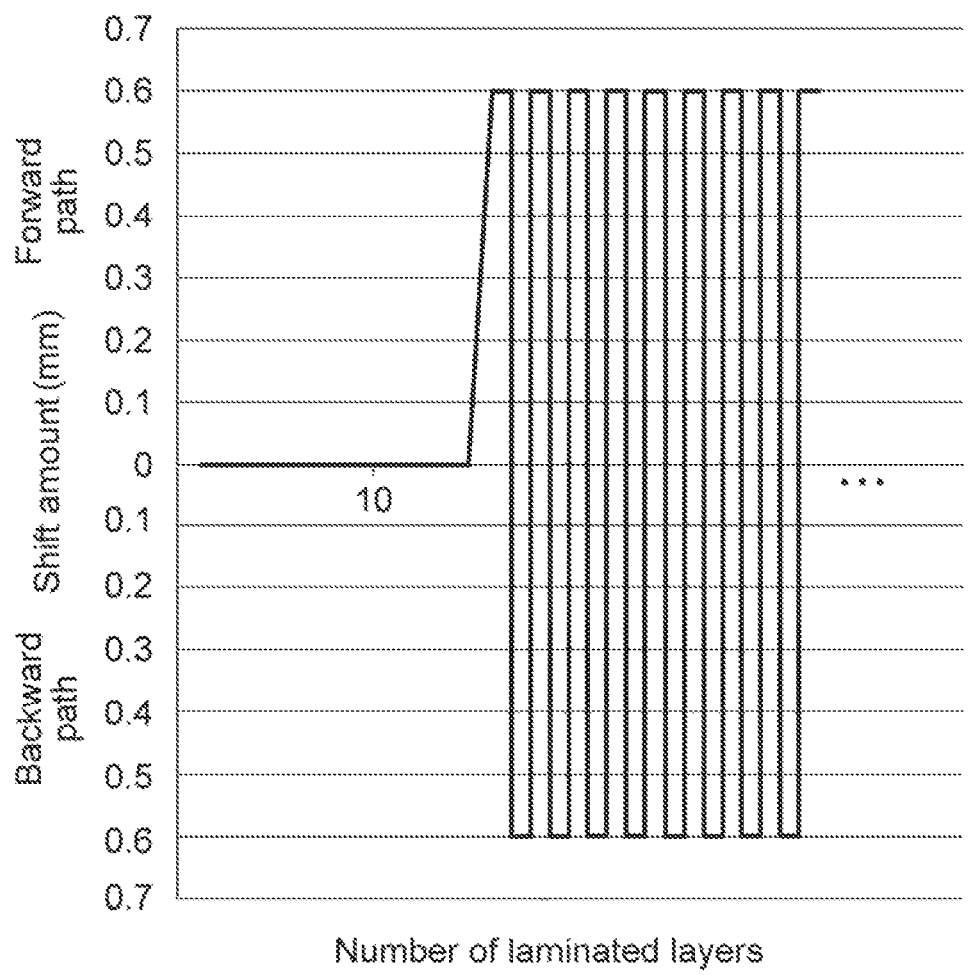
FIG. 9 is a graph showing a relationship between the number of layers and the shift amount of the irradiation position according to the modeling apparatus according to Embodiment 2.

FIG. 9 is a graph showing a relationship between the number of layers and the shift amount of the irradiation position according to this modeling apparatus 200. That is obtained by applying the profile of Example 1 shown in FIG. 5 to the reciprocating light exposure processing of this Embodiment 2. In accordance with this profile, after a first layer (e.g., 16th layer) of the number of layers in the second range, light exposure is performed while shifting from the reference irradiation position in a +x' direction and a −x' direction for each layer as shown in FIGS. 8A and 8B.

In accordance with such reciprocating light exposure processing, the modeling speed increases and the productivity can be improved. Further, as in Embodiment 1 described above, a suitable irradiation position can be set in accordance with the number of layers and the modeling accuracy can be improved.

The profile of the shift amount shown in FIG. 7 may be applied to the modeling apparatus 200 according to this Embodiment 2. In this case, in the third range in which the irradiation position stepwisely shifts for each layer, for example, such a setting that for each layer, the irradiation position alternately swings, using the reference irradiation position as a center.

Also in this Embodiment 2, the compensation unit 55 shifts the reference position on the coordinate of the slice image data item in accordance with the shift amount of the irradiation position from the reference irradiation position B. With this, occurrence of a deviation of a physical modeling position on the x' axis is prevented.

3. EMBODIMENT 3

Figure 10:
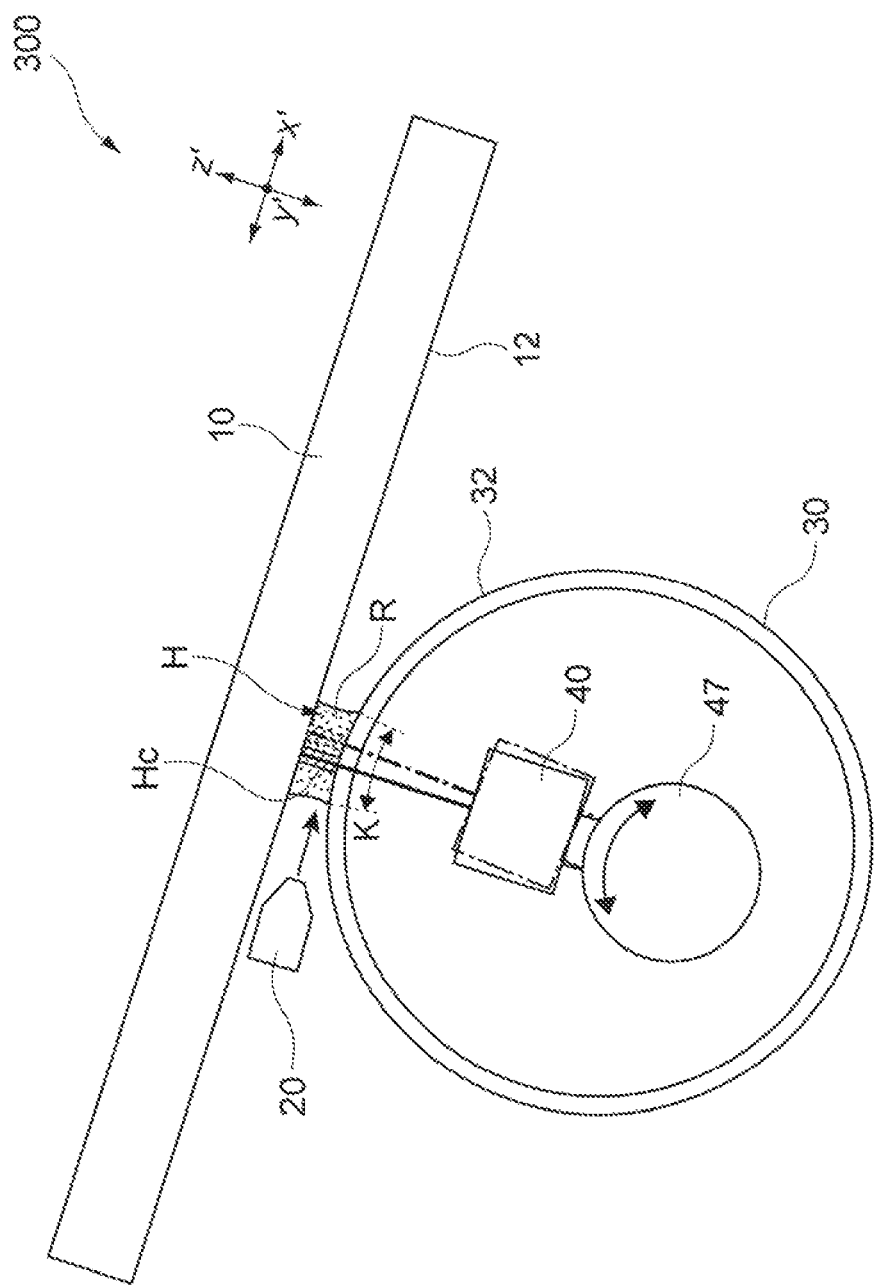
FIG. 10 is a side view showing a modeling apparatus according to Embodiment 3.

FIG. 10 is a side view showing a modeling apparatus according to Embodiment 3. This modeling apparatus 300 includes a rotating mechanism 47. The rotating mechanism 47 changes an angle of irradiation by the irradiation unit 40 by rotating the irradiation unit 40 about a y' axis. With this, the irradiation position to the resin material R held in the holding region H shifts. With such a configuration of the modeling apparatus 300, effects similar to those of Embodiments 1 and 2 described above can be obtained.

Also in this Embodiment 2, the compensation unit 55 shifts the reference position on the coordinate of the slice image data item in accordance with the shift amount of the irradiation position from the reference irradiation position B. With this, occurrence of a deviation of a physical modeling position on the x' axis is prevented.

4. Modified Examples

In each of the above-mentioned embodiments, the irradiation position is controlled in accordance with the number of laminated layers of the resin material. However, the irradiation position may be controlled in accordance with a distance between the modeling surface 12 of the stage 10 and the adjacent region K (distance in the direction (z' direction) perpendicular to the modeling surface 12). That distance is proportional to the number of layers, and thus the concept of this modified example is the same as the concept of each of the above-mentioned embodiments. For example, that distance is measured by using an optical, magnetic, or electrostatic means.

The control unit 50 may include a program for presenting information for the user to select modeling processing based on at least one of the profiles shown in FIGS. 5, 7, 9, and the like (e.g., screen and sound indicating that information). In that case, that function of the control unit 50 functions as a "presentation unit".

In the above-mentioned embodiments, the control unit 50 acquires the profile shown in FIGS. 5, 7, 9, and the like in advance before the modeling processing and controls the irradiation position on the basis of that profile. However, the control unit 50 may be configured to add, for example, the shape or the like of the modeled object as a parameter in addition to that file and control the irradiation position on the basis of it.

In each of the above-mentioned embodiments, the stage moving mechanism 60 that moves the stage 10 is provided. However, a moving mechanism that does not move the stage 10 and moves the drum 30 along the x', z' axis may be provided. Alternatively, the stage 10 may be configured to move along the x' axis (or the z' axis) and the drum 30 may be configured to move along the z' axis (or the x' axis).

In the above-mentioned embodiments, the shape of the drum 30 (regulation member) has a cylindrical shape. However, the shape of the regulation member may be a shape of a part of the cylinder (part of circular arc as viewed in the y axis), such as a semi-circle or a ¼-circle. With this, the limitation on the capacity of cylinder is eliminated and the configuration and the degree of freedom in arrangement of the irradiation unit 40 can be enhanced. Further, a higher accurate irradiation position can be provided by increasing the size of the irradiation unit 40. The surface of the regulation member does not need to be a cylindrical surface. As long as a surface including an adjacent region long along the y axis is provided, that surface may be a curve surface having any shape.

Although the stage 10 is arranged to be tilted in Embodiments 1 and 3 described above, the stage 10 may be horizontally arranged as in Embodiment 2 described above. Or, although the stage 10 is arranged such that the modeling surface 12 is horizontal in Embodiment 2 described above, reciprocating light exposure may be executed on the stage 10 with the modeling surface 12 tilted as shown in Embodiment 1. In that case, the stage 10 moves such that the direction of tilt is alternately reversed on the forward path of the light exposure processing for one layer and the backward path of the light exposure processing for one layer.

It should be noted that the present technology may also take the following configurations.

(1)

An information processing apparatus to be used for a modeling apparatus including a stage including a modeling surface on which a modeled object is formed, a regulation member including a surface including an adjacent region, the regulation member being capable of being arranged with respect to the stage to form a holding region for holding a material between the adjacent region and the stage, an irradiation unit that selectively radiates, on the basis of a plurality of slice image data items that constitute three-dimensional data of an object to be modeled, an energy ray to a region of the material held in the holding region via the adjacent region of the regulation member, and a moving mechanism that moves the stage and the regulation member relative to each other, the information processing apparatus including:

an acquisition unit configured to acquire the plurality of slice image data items;

an irradiation position control unit configured to variably control, in accordance with the number of laminated layers of the material, an irradiation position of the energy ray to the material in a direction of relative movement of the stage and the regulation member within the modeling surface; and a compensation unit configured to compensate for a reference position of at least one slice image data item of the plurality of slice image data items in accordance with a change of the irradiation position.

(2)

The information processing apparatus according to (1), in which the compensation unit is configured to shift, if a first region of the holding region includes a reference irradiation position, the reference position in accordance with a shift amount of the irradiation position from the reference irradiation position, the first region being located between a region of the adjacent region, which is closest to the stage, and the stage.

(3)

The information processing apparatus according to (1) or (2), in which the irradiation position control unit radiates, when the number of layers of the material is in a first range, the energy ray to the material located in a first region of the holding region, the first region being located between a region of the adjacent region, which is closest to the stage, and the stage, and radiates, when the number of layers of the material is in a second range larger than the first range, the energy ray to the material located in a second region of the holding region, the second region being different from the first region.

(4)

The information processing apparatus according to (3), in which the irradiation position control unit shifts, when the number of laminated layers of the material is in a third range, the irradiation position stepwisely from the first region to the second region for each layer or for every multiple layers, the third range being larger than the first range and smaller than the second range.

(5)

The information processing apparatus according to any one of (1) to (4), in which the irradiation position control unit sets the irradiation position on a side opposite to a side of a direction of travel of the stage with respect to the regulation member, using the reference irradiation position as a center.

(6)

The information processing apparatus according to (5), in which the moving mechanism reciprocates the stage or the regulation member in a direction of relative movement within the modeling surface, and the irradiation position control unit respectively sets the irradiation position for each of forward movement and backward movement of the stage or the regulation member and radiates the energy ray.

(7)

The information processing apparatus according to any one of (1) to (6), further including a presentation unit that presents information for a user to select modeling processing based on one profile of a plurality of profiles expressing a change of the irradiation position for each number of layers.

(8)

An information processing apparatus to be used for a modeling apparatus including a stage including a modeling surface on which a modeled object is formed, a regulation member including a surface including an adjacent region, the regulation member being capable of being arranged with respect to the stage to form a holding region for holding a material between the adjacent region and the stage, an irradiation unit that selectively radiates, on the basis of a plurality of slice image data items that constitute three-dimensional data of an object to be modeled, an energy ray to a region of the material held in the holding region via the adjacent region of the regulation member, and a moving mechanism that moves the stage and the regulation member relative to each other, the information processing apparatus including:

an acquisition unit configured to acquire the plurality of slice image data items;

an irradiation position control unit configured to variably control, in accordance with a distance between the modeling surface and the adjacent region, an irradiation position of the energy ray to the material in a direction of relative movement of the stage and the regulation member within the modeling surface; and a compensation unit configured to compensate for a reference position of at least one slice image data item of the plurality of slice image data items in accordance with a change of the irradiation position.

(9)

A modeling apparatus, including:

an acquisition unit configured to acquire a plurality of slice image data items that constitute three-dimensional data of an object to be modeled;

a stage including a modeling surface on which a modeled object is formed;

a regulation member including a surface including an adjacent region, the regulation member being capable of being arranged with respect to the stage to form a holding region for holding a material between the adjacent region and the stage;

an irradiation unit that selectively radiates, on the basis of the plurality of slice image data items, an energy ray to a region of the material held in the holding region via the adjacent region of the regulation member;

a moving mechanism that moves the stage and the regulation member relative to each other;

an irradiation position control unit configured to variably control, in accordance with the number of laminated layers of the material, an irradiation position of the energy ray to the material in a direction of relative movement of the stage and the regulation member within the modeling surface; and a compensation unit configured to compensate for a reference position of at least one slice image data item of the plurality of slice image data items in accordance with a change of the irradiation position.

(10)

A modeling apparatus, including:

an acquisition unit configured to acquire a plurality of slice image data items that constitute three-dimensional data of an object to be modeled;

a stage including a modeling surface on which a modeled object is formed;

a regulation member including a surface including an adjacent region, the regulation member being capable of being arranged with respect to the stage to form a holding region for holding a material between the adjacent region and the stage;

an irradiation unit that selectively radiates, on the basis of the plurality of slice image data items, an energy ray to a region of the material held in the holding region via the adjacent region of the regulation member;

a moving mechanism that moves the stage and the regulation member relative to each other;

an irradiation position control unit configured to variably control, in accordance with a distance between the modeling surface and the adjacent region, an irradiation position of the energy ray to the material in a direction of relative movement of the stage and the regulation member within the modeling surface; and a compensation unit configured to compensate for a reference position of at least one slice image data item of the plurality of slice image data items in accordance with a change of the irradiation position.

(11)

An information processing method to be used for a modeling apparatus including a stage including a modeling surface on which a modeled object is formed, a regulation member including a surface including an adjacent region, the regulation member being capable of being arranged with respect to the stage to form a holding region for holding a material between the adjacent region and the stage, and a moving mechanism that moves the stage and the regulation member relative to each other, the information processing method including:

acquiring a plurality of slice image data items that constitute three-dimensional data of an object to be modeled;

selectively radiating, by an irradiation unit on the basis of the plurality of slice image data items, an energy ray to a region of the material held in the holding region via the adjacent region of the regulation member;

variably controlling, in accordance with the number of laminated layers of the material, an irradiation position of the energy ray to the material in a direction of relative movement of the stage and the regulation member within the modeling surface; and compensating for a reference position of at least one slice image data item of the plurality of slice image data items in accordance with a change of the irradiation position.

(12)

An information processing method to be used for a modeling apparatus including a stage including a modeling surface on which a modeled object is formed, a regulation member including a surface including an adjacent region, the regulation member being capable of being arranged with respect to the stage to form a holding region for holding a material between the adjacent region and the stage, and a moving mechanism that moves the stage and the regulation member relative to each other, the information processing method including:

acquiring a plurality of slice image data items that constitute three-dimensional data of an object to be modeled;

selectively radiating, by an irradiation unit on the basis of the plurality of slice image data items, an energy ray to a region of the material held in the holding region via the adjacent region of the regulation member;

variably controls, in accordance with a distance between the modeling surface and the adjacent region, an irradiation position of the energy ray to the material in a direction of relative movement of the stage and the regulation member within the modeling surface; and compensating for a reference position of at least one slice image data item of the plurality of slice image data items in accordance with a change of the irradiation position.

(13)

A program to be used for a modeling apparatus including a stage including a modeling surface on which a modeled object is formed, a regulation member including a surface including an adjacent region, the regulation member being capable of being arranged with respect to the stage to form a holding region for holding a material between the adjacent region and the stage, and a moving mechanism that moves the stage and the regulation member relative to each other, the program causing the modeling apparatus to:

acquire a plurality of slice image data items that constitute three-dimensional data of an object to be modeled;

selectively radiate, by an irradiation unit on the basis of the plurality of slice image data items, an energy ray to a region of the material held in the holding region via the adjacent region of the regulation member;

variably control, in accordance with the number of laminated layers of the material, an irradiation position of the energy ray to the material in a direction of relative movement of the stage and the regulation member within the modeling surface; and compensate for a reference position of at least one slice image data item of the plurality of slice image data items in accordance with a change of the irradiation position.

(14)

A program to be used for a modeling apparatus including a stage including a modeling surface on which a modeled object is formed, a regulation member including a surface including an adjacent region, the regulation member being capable of being arranged with respect to the stage to form a holding region for holding a material between the adjacent region and the stage, and a moving mechanism that moves the stage and the regulation member relative to each other, the program causing the modeling apparatus to:

acquire a plurality of slice image data items that constitute three-dimensional data of an object to be modeled;

selectively radiate, by an irradiation unit on the basis of the plurality of slice image data items, an energy ray to a region of the material held in the holding region via the adjacent region of the regulation member;

variably control, in accordance with a distance between the modeling surface and the adjacent region, an irradiation position of the energy ray to the material in a direction of relative movement of the stage and the regulation member within the modeling surface; and compensate for a reference position of at least one slice image data item of the plurality of slice image data items in accordance with a change of the irradiation position.

REFERENCE SIGNS LIST 10 stage
12 modeling surface
20 nozzle
30 drum
32 surface
40 irradiation unit
45 irradiation unit moving mechanism
47 rotating mechanism
50 control unit
51 data acquisition unit
53 irradiation position control unit
55 compensation unit
60 stage moving mechanism
61 first moving mechanism
62 second moving mechanism
100, 200, 300 modeling apparatus

The invention claimed is:

1. An information processing apparatus configured for use with a modeling apparatus including:
a stage configured to be titled and including a modeling surface on which a modeled object is formed by the modeling apparatus,
a regulation member including a cylindrical surface comprising an adjacent region adjacent to the stage, the regulation member configured to be arranged below the stage to form a holding region for holding a modeling material between the adjacent region and the stage,
an irradiation unit that selectively radiates, on a basis of a plurality of slice image data items that constitute three-dimensional data of an object to be modeled, an energy ray to a region of the modeling material held in the holding region via the adjacent region of the regulation member, and
a moving mechanism that moves the stage and the regulation member relative to each other, the information processing apparatus comprising:
an acquisition unit configured to acquire the plurality of slice image data items;
an irradiation position control unit configured to variably control, in accordance with a number of laminated layers of the modeling material, an irradiation position of the energy ray to the modeling material in a direction of relative movement of the stage and the regulation member parallel to the modeling surface; and
a compensation unit configured to compensate for a reference position of at least one slice image data item of the plurality of slice image data items in accordance with a change of the irradiation position made by the irradiation position control unit.

2. The information processing apparatus according to claim 1, wherein
the compensation unit is configured to shift, if a first region of the holding region includes a reference irradiation position, the reference position in accordance with a shift amount of the irradiation position from the reference irradiation position, the first region being located between a region of the adjacent region, which is closest to the stage, and the stage.

3. The information processing apparatus according to claim 1, wherein
the irradiation position control unit:
causes the irradiation unit to radiate, when the number of laminated layers of the modeling material is in a first range, the energy ray to the modeling material located in a first region of the holding region, the first region being located between a region of the adjacent region, which is closest to the stage, and the stage, and
causes the irradiation unit to radiate, when the number of laminated layers of the modeling material is in a second range larger than the first range, the energy ray to the modeling material located in a second region of the holding region, the second region being different from the first region.

4. The information processing apparatus according to claim 3, wherein
the irradiation position control unit shifts, when the number of laminated layers of the modeling material is in a third range, the irradiation position stepwise from the first region to the second region for each layer or for every multiple layers of the modeling material, the third range being larger than the first range and smaller than the second range.

5. The information processing apparatus according to claim 1, wherein
the irradiation position control unit sets the irradiation position opposite to a side of a direction of travel of the stage with respect to the regulation member, using a reference irradiation position as a center.

6. The information processing apparatus according to claim 5, wherein:

the moving mechanism reciprocates the stage or the regulation member in a direction of relative movement parallel to the modeling surface, and the irradiation position control unit respectively sets the irradiation position for each of reciprocating movements of the stage or the regulation member and causes the irradiation unit to radiate the energy ray.

7. The information processing apparatus according to claim 1, further comprising a presentation unit that presents information for a user to select modeling processing based on one profile of a plurality of profiles expressing a change of the irradiation position for each of the number of laminated layers.

8. An information processing apparatus configured for use with a modeling apparatus including:

a stage configured to be titled and including a modeling surface on which a modeled object is formed by the modeling apparatus, a regulation member including a cylindrical surface comprising an adjacent region adjacent to the stage, the regulation member configured to be arranged below the stage to form a holding region for holding a modeling material between the adjacent region and the stage, an irradiation unit that selectively radiates, on a basis of a plurality of slice image data items that constitute three-dimensional data of an object to be modeled, an energy ray to a region of the modeling material held in the holding region via the adjacent region of the regulation member, and a moving mechanism that moves the stage and the regulation member relative to each other, the information processing apparatus comprising:

an acquisition unit configured to acquire the plurality of slice image data items;

an irradiation position control unit configured to variably control, in accordance with a distance between the modeling surface and the adjacent region, an irradiation position of the energy ray to the modeling material in a direction of relative movement of the stage and the regulation member parallel to the modeling surface; and a compensation unit configured to compensate for a reference position of at least one slice image data item of the plurality of slice image data items in accordance with a change of the irradiation position made by the irradiation position control unit.

9. A modeling apparatus, comprising:

an acquisition unit configured to acquire a plurality of slice image data items that constitute three-dimensional data of an object to be modeled;

a stage configured to be titled and including a modeling surface on which a modeled object is formed by the modeling apparatus;

a regulation member including a cylindrical surface comprising an adjacent region adjacent to the stage, the regulation member configured to be arranged below the stage to form a holding region for holding a modeling material between the adjacent region and the stage;

an irradiation unit that selectively radiates, on a basis of the plurality of slice image data items, an energy ray to a region of the modeling material held in the holding region via the adjacent region of the regulation member;

a moving mechanism that moves the stage and the regulation member relative to each other;

an irradiation position control unit configured to variably control, in accordance with a number of laminated layers of the modeling material, an irradiation position of the energy ray to the modeling material in a direction of relative movement of the stage and the regulation member parallel to the modeling surface; and a compensation unit configured to compensate for a reference position of at least one slice image data item of the plurality of slice image data items in accordance with a change of the irradiation position made by the irradiation position control unit.

10. A modeling apparatus, comprising:

an acquisition unit configured to acquire a plurality of slice image data items that constitute three-dimensional data of an object to be modeled;

a stage configured to be titled and including a modeling surface on which a modeled object is formed by the modeling apparatus;

a regulation member including a cylindrical surface comprising an adjacent region adjacent to the stage, the regulation member configured to be arranged below the stage to form a holding region for holding a modeling material between the adjacent region and the stage;

an irradiation unit that selectively radiates, on a basis of the plurality of slice image data items, an energy ray to a region of the modeling material held in the holding region via the adjacent region of the regulation member;

a moving mechanism that moves the stage and the regulation member relative to each other;

an irradiation position control unit configured to variably control, in accordance with a distance between the modeling surface and the adjacent region, an irradiation position of the energy ray to the modeling material in a direction of relative movement of the stage and the regulation member parallel to the modeling surface; and a compensation unit configured to compensate for a reference position of at least one slice image data item of the plurality of slice image data items in accordance with a change of the irradiation position made by the irradiation position control unit.

11. An information processing method configured for use with a modeling apparatus including:

a stage configured to be titled and including a modeling surface on which a modeled object is formed by the modeling apparatus, a regulation member including a cylindrical surface comprising an adjacent region adjacent to the stage, the regulation member configured to be arranged below the stage to form a holding region for holding a modeling material between the adjacent region and the stage, and a moving mechanism that moves the stage and the regulation member relative to each other, the information processing method comprising:

acquiring a plurality of slice image data items that constitute three-dimensional data of an object to be modeled;

selectively radiating, by an irradiation unit on a basis of the plurality of slice image data items, an energy ray to a region of the modeling material held in the holding region via the adjacent region of the regulation member;

variably controlling, in accordance with a number of laminated layers of the modeling material, an irradiation position of the energy ray to the modeling material in a direction of relative movement of the stage and the regulation member parallel to the modeling surface; and compensating for a reference position of at least one slice image data item of the plurality of slice image data items in accordance with a change of the irradiation position made by the variable control.

12. An information processing method configured for use with a modeling apparatus including:
   a stage configured to be titled and including a modeling surface on which a modeled object is formed by the modeling apparatus,
   a regulation member including a cylindrical surface comprising an adjacent region adjacent to the stage, the regulation member configured to be arranged below the stage to form a holding region for holding a modeling material between the adjacent region and the stage, and
   a moving mechanism that moves the stage and the regulation member relative to each other, the information processing method comprising:

acquiring a plurality of slice image data items that constitute three-dimensional data of an object to be modeled;

selectively radiating, by an irradiation unit on a basis of the plurality of slice image data items, an energy ray to a region of the modeling material held in the holding region via the adjacent region of the regulation member;

variably controlling, in accordance with a distance between the modeling surface and the adjacent region, an irradiation position of the energy ray to the modeling material in a direction of relative movement of the stage and the regulation member parallel to the modeling surface; and compensating for a reference position of at least one slice image data item of the plurality of slice image data items in accordance with a change of the irradiation position made by the variable control.

* * * * *